United States Patent [19]

Sturm, Jr. et al.

[11] Patent Number: 5,855,540

[45] Date of Patent: Jan. 5, 1999

[54] SYSTEM FOR PERFORMING WORK IN A HOT CELL

[75] Inventors: Albert J. Sturm, Jr., Stillwater; Thomas E. Marrinan, Minneapolis; Fred W. Hanson, White Bear Lake; Dean R. LaValle, Centerville, all of Minn.

[73] Assignee: Par Systems, Inc., Shoreview, Mich.

[21] Appl. No.: 897,381

[22] Filed: Jul. 21, 1997

Related U.S. Application Data

[63] Continuation of Ser. No. 631,849, Apr. 12, 1996, abandoned.

[51] Int. Cl.[6] .............................. B23Q 3/155; B25J 3/00
[52] U.S. Cl. .............................. 483/16; 414/8; 483/901; 901/17
[58] Field of Search ................... 483/16, 12, 13, 483/901; 414/7, 8; 901/17; 165/11.2

[56] References Cited

U.S. PATENT DOCUMENTS

| | | | |
|---|---|---|---|
| 3,164,267 | 1/1965 | Jelatis et al. ........................ | 414/7 |
| 4,231,419 | 11/1980 | Gugel ................................. | 165/11 A |
| 4,474,518 | 10/1984 | Critchley et al. .................... | 414/8 |
| 4,526,311 | 7/1985 | Schröder ............................. | 228/119 |
| 4,656,509 | 4/1987 | Matsuyama et al. ................. | 358/100 |
| 4,850,779 | 7/1989 | Cashell et al. ....................... | 414/3 |
| 4,919,194 | 4/1990 | Gery et al. ........................... | 165/1 |
| 4,993,913 | 2/1991 | Ohtsuki ............................... | 414/729 |
| 5,141,378 | 8/1992 | Lestournel et al. .................. | 414/8 |
| 5,379,664 | 1/1995 | Kershaw et al. ..................... | 74/490.05 |
| 5,482,169 | 1/1996 | Simon et al. ........................ | 212/245 |

FOREIGN PATENT DOCUMENTS

| | | | |
|---|---|---|---|
| 50561 | 4/1982 | European Pat. Off. ............. | 901/17 |
| 2132981 | 7/1984 | United Kingdom . | |

Primary Examiner—William H. Briggs
Attorney, Agent, or Firm—Westman, Champlin & Kelly, P.A.; S. Koehler

[57] ABSTRACT

A system for performing work in a hot cell includes a support arm having a first end and a second end and a movable arm having an end selectively engageable with the first end to form a rigid connection. Complementary coupling devices are disposed on the first end of the support arm and on the end of the movable arm and mate together when the movable arm is joined to the support arm.

29 Claims, 12 Drawing Sheets

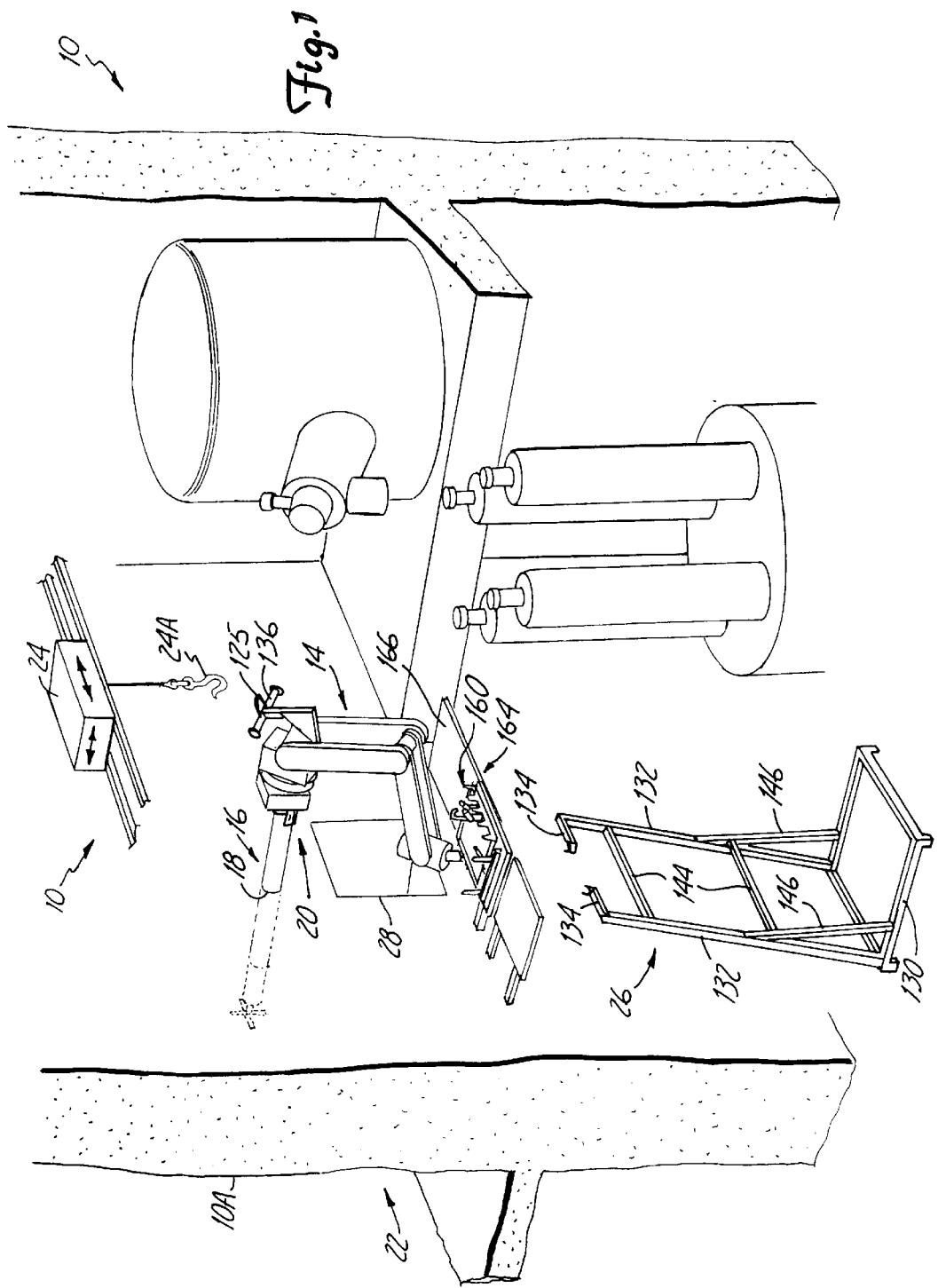

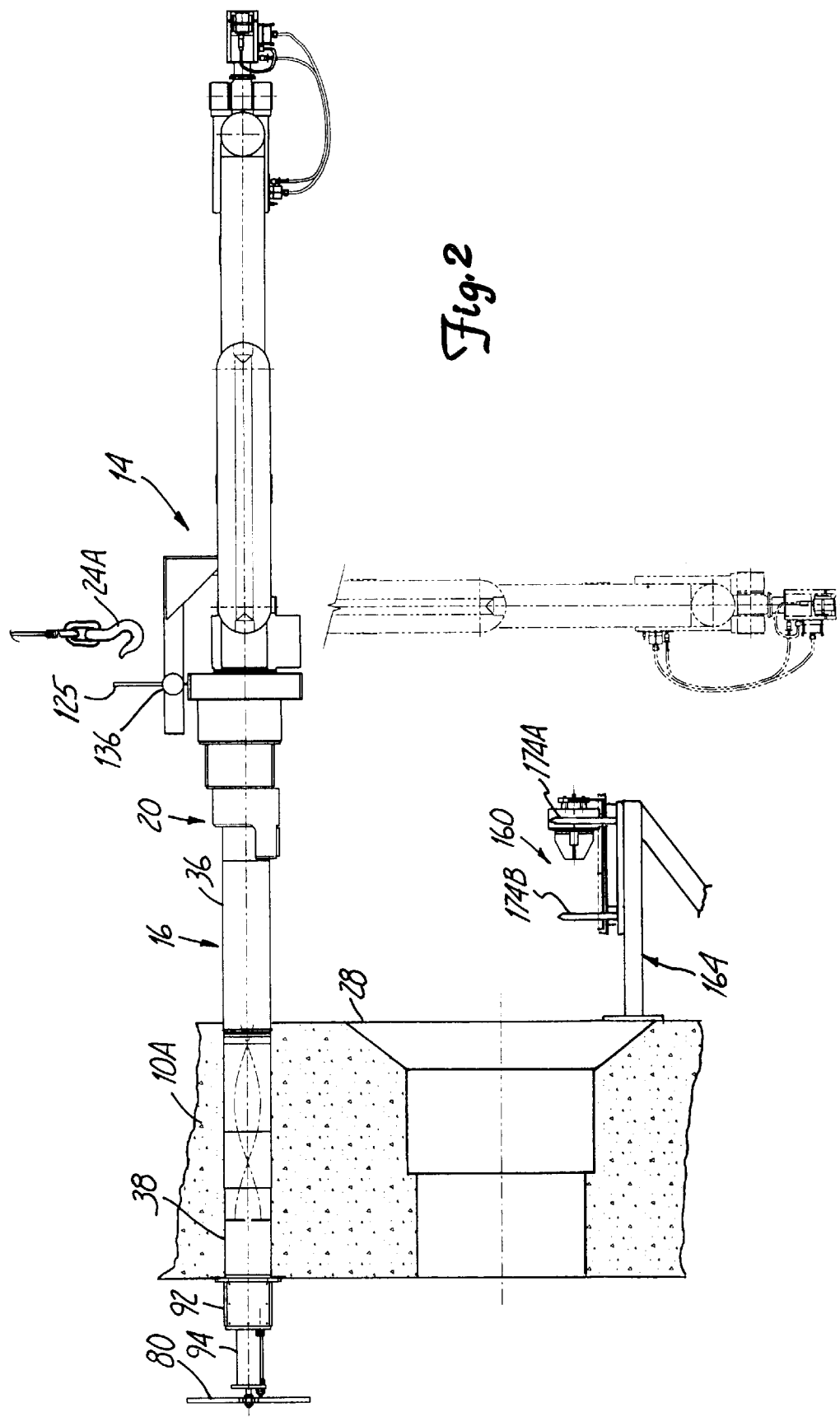

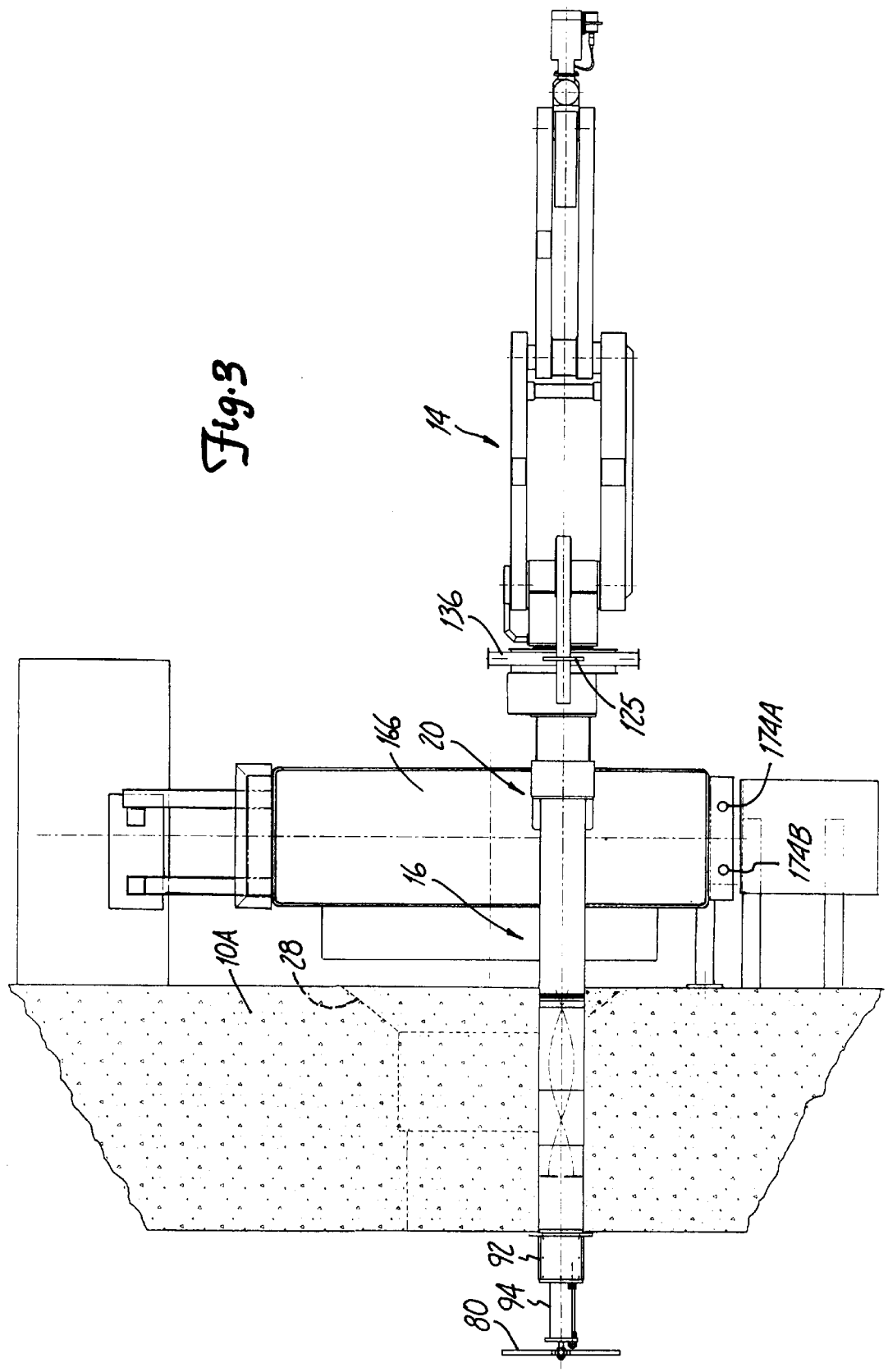

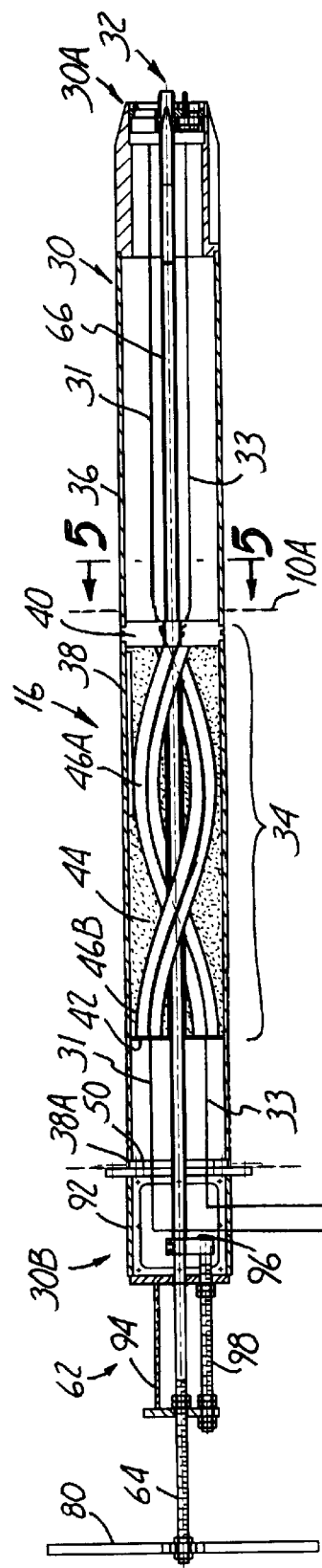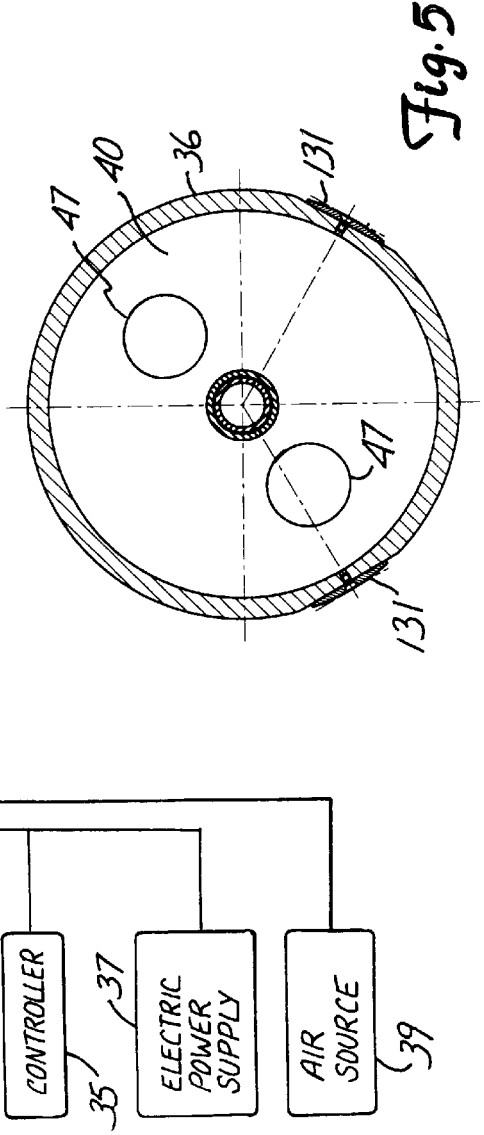

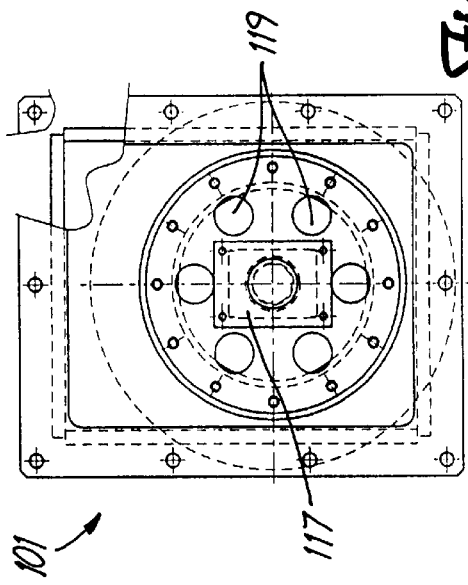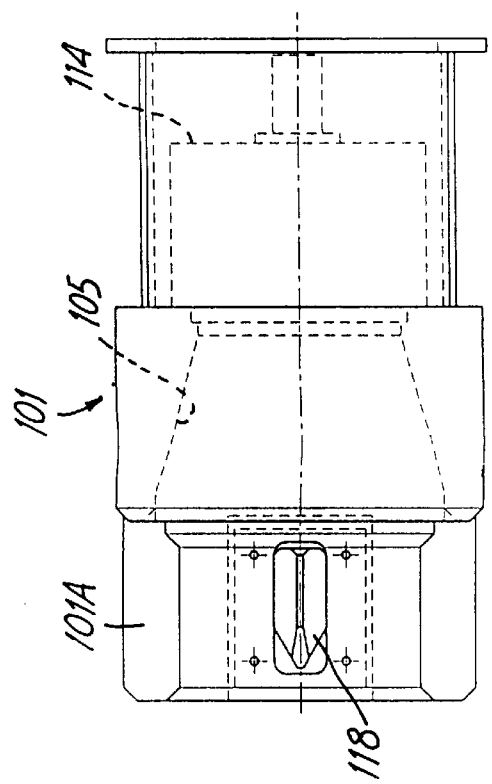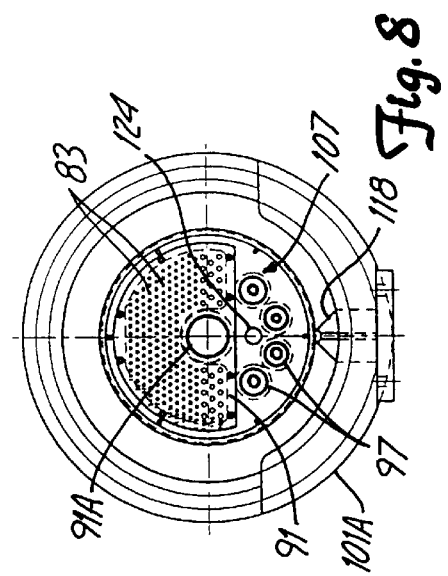

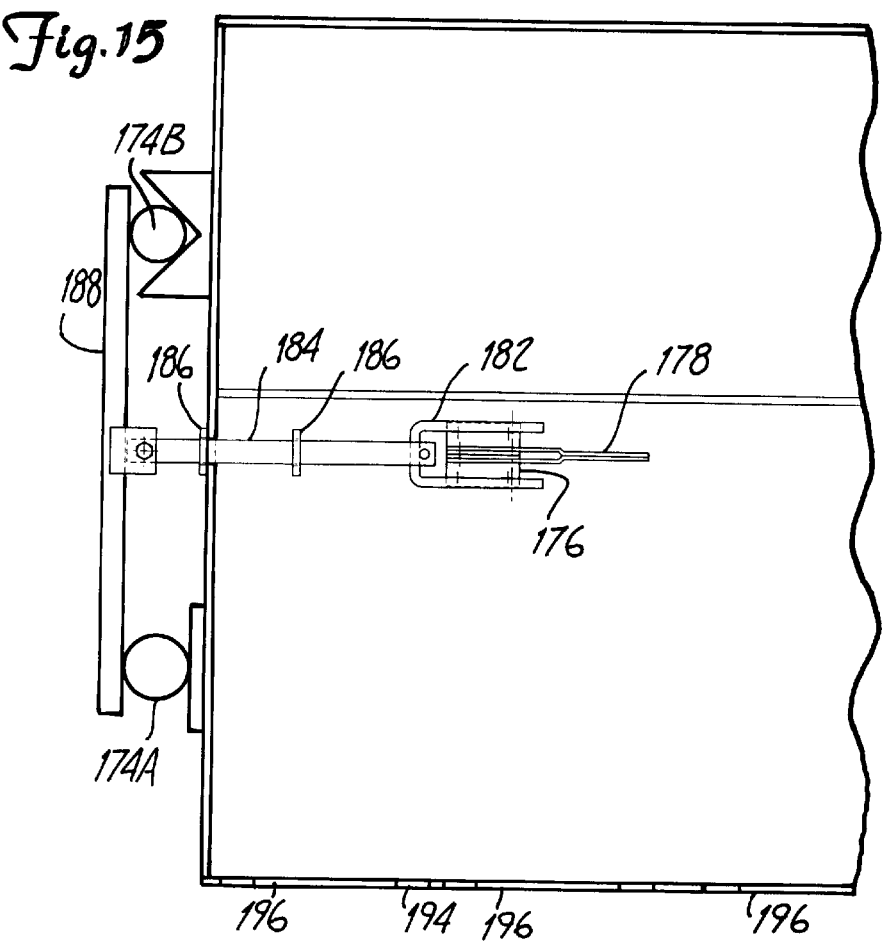
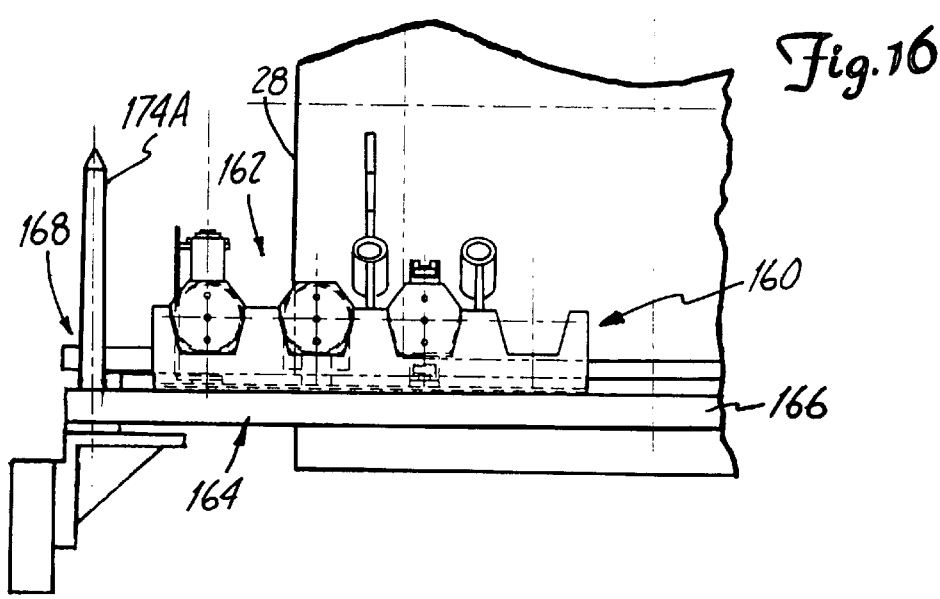

SYSTEM FOR PERFORMING WORK IN A HOT CELL

This is a continuation of application Ser. No. 08/631,849, filed Apr. 12, 1996 now abandoned.

BACKGROUND OF THE INVENTION

The present invention relates to a system for performing work within a sealed enclosure such as a hot cell. More particularly, the present invention relates to a system that allows an operator located outside of the sealed enclosure to control a remote arm located in the sealed enclosure.

Sealed enclosures, commonly known as "hot cells", are used throughout the nuclear industry to contain radiation around radioactive handling equipment. A typical hot cell includes a ceiling, a floor and walls formed of concrete having a thickness sufficient to prevent radiation and radioactive particles from leaving the hot cell. Holes of limited diameter (for example 10 inches) are provided at various locations in the walls. Each hole allows a manipulator to be inserted into the hot cell to perform work on the equipment. The manipulator includes a movable arm portion that can be inserted through the hole and a straight portion that is supported by the inner wall of the hole. Controls are provided on an end of the straight portion and are connected directly to the movable arm with cables to allow an operator to control movement of the arm. When the operator's work is completed, the operator removes the manipulator from the hot cell by pulling it out back through the hole. Since the manipulator, and in particular the movable arm, must be inserted through the hole, the movable arm can not be any larger than the diameter of the hole. This is a significant disadvantage because it limits the carrying capacity of the manipulator.

SUMMARY OF THE INVENTION

A system for performing work in a hot cell includes a support arm having a first end and a second end and a movable arm having an end selectively engageable with the first end to form a rigid connection. Complementary coupling devices are disposed on the first end of the support arm and on the end of the movable arm and mate together when the movable arm is joined to the support arm.

In a preferred embodiment, the system further includes a storage rack for supporting the movable arm when the movable arm is not joined to the support arm. A crane is included and transports the movable arm to and from the storage rack. Unlike manipulators of the prior art that are inserted through a wall in the hot cell, the movable arm is selectively attached to the support arm with the coupling located in the hot cell. All power, control and video signals are provided to the movable arm through the support arm and the coupling. By decoupling the movable arm from the support arm, the system of the present invention can be used with existing hot cells, which have holes through which the support arm can be inserted. The system of the present invention can lift heavier objects and have a greater reach than the prior art manipulators since the movable arm does not need to be inserted through the hole of the hot cell wall.

BRIEF DESCRIPTION OF THE DRAWINGS

FIG. 1 is a perspective view of a portion of a hot cell and a system of the present invention for performing work in the hot cell.

FIG. 2 is a side elevational view of a portion of the hot cell and a support arm and a movable arm of the present invention.

FIG. 3 is a top plan view of a portion of the hot cell the support arm and the movable arm.

FIG. 4 is a sectional view of the support arm.

FIG. 5 is a sectional view of the support arm taken along lines 5—5 of FIG. 4.

FIG. 8 is a front elevational view of the coupling portion of the movable arm.

FIG. 9 is a top plan view of the coupling portion of the movable arm.

FIG. 10 is a rear elevational view of the coupling portion of the movable arm.

FIG. 15 is a top plan view of a portion of the tool table.

FIG. 16 is a front elevational view of the tool table.

DETAILED DESCRIPTION OF THE PREFERRED EMBODIMENTS

Figure 6:
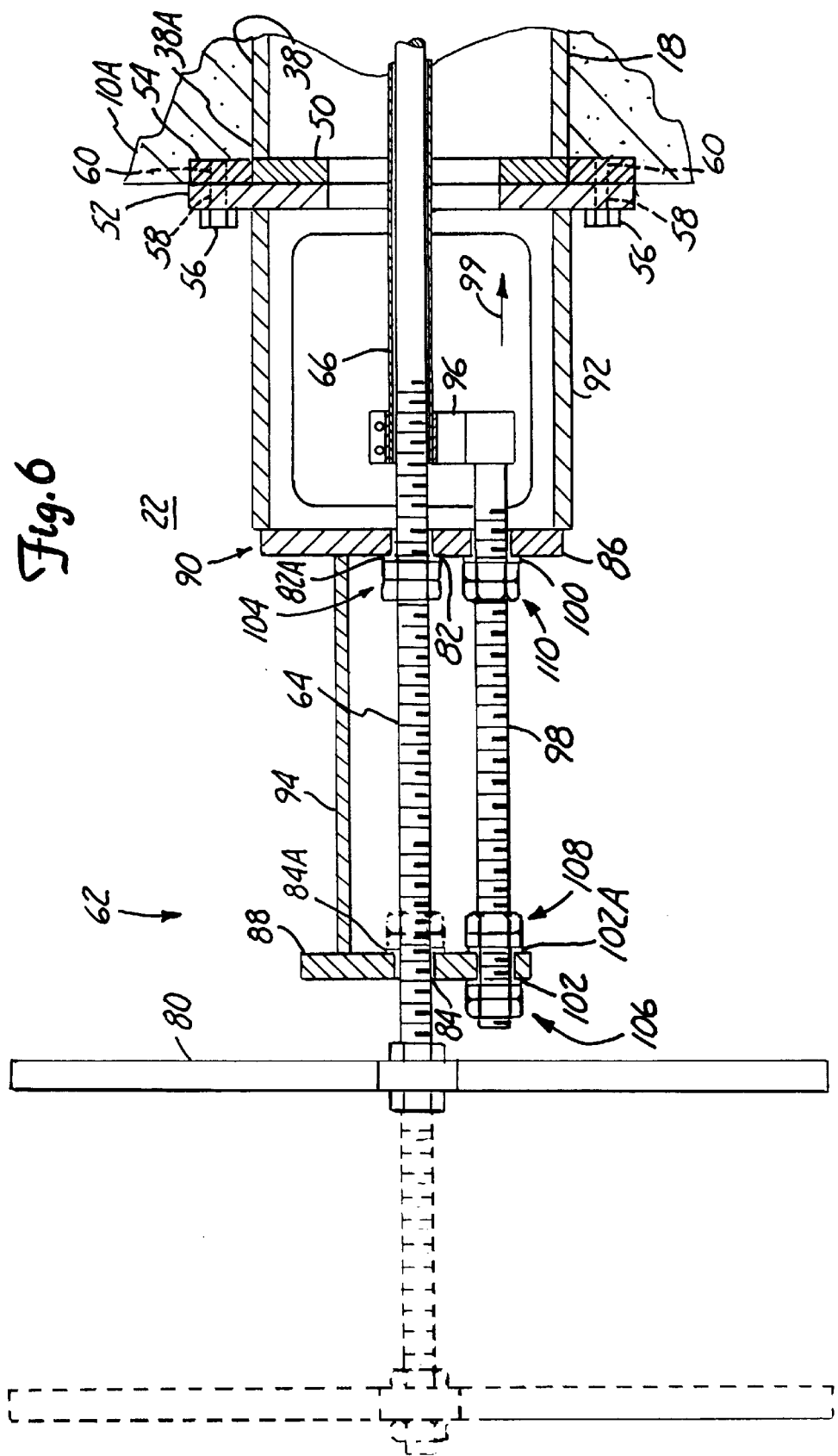
FIG. 6 is a sectional view of a portion of the support arm.

A system for performing work within a hot cell 10 is illustrated generally at 12 in FIG. 1. The system 12 includes a movable arm 14 for performing work within the hot cell 10. Unlike manipulators of the prior art that are inserted through a hole 18 in a wall 10A of the hot cell 10, the movable arm 14 is selectively attached to a support arm 16 that extends through the hole 18. The movable arm 14 is coupled to the support arm 16 with a coupling 20 located in the hot cell 10. All power and control signals are provided to the movable arm 14 from a region 22 outside of the hot cell 10 and through the support arm 16 and the coupling 20. When not in use, the movable arm 14 is decoupled from the support arm 16 and moved by a crane 24 to a storage rack 26. The support arm 16 is then extracted from the hole 18 and stored outside of the hot cell 10. By decoupling the movable arm 14 from the support arm 16, the system 12 of the present invention can be used with existing hot cells 10 having holes 18, but can lift heavier objects and have greater reach than the prior art manipulators, which were designed to be completely inserted through the hole 18.

Referring also to FIGS. 2 and 3, the hole 18 is typically located in the wall 10A of the hot cell 10 proximate a window 28. The window 28 allows an operator to control movements of the movable arm 14 in order to perform work within the hot cell 10.

The support arm 16 is illustrated in detail in FIG. 4. Generally, the support arm 16 includes an outer cylindrical housing 30 having a first end 30A and a second end 30B. The outer housing 30 has a shape to correspond with the shape of the hole 18. In the embodiment illustrated, the outer housing 30 is cylindrical having a diameter suitable for insertion into and through the hole 18. The first end 30A includes coupling devices 32, described below, that couple to corresponding devices on the movable arm 14 to provide electrical and pneumatic connections for control signals and power signals for the movable arm 14. Electrical lines 31 and pneumatic lines 33, both shown schematically, extend from the first end 30A through the outer housing 30 to the second end 30B. The electrical lines 31 are connected to a controller 35 and a suitable power supply 37 to provide control signals and electrical power, respectively, to the movable arm 14. Video signals can also be transmitted from cameras mounted on the moveable arm, through the coupling devices 32 and to the controller 35. The pneumatic lines 33 are connected to a suitable air source 39.

In the embodiment illustrated, the outer housing 30 includes a first tubular portion 36 and a second tubular portion 38. A coupling plate 40 disposed within the support arm 16 joins the first tubular portion 36 to the second tubular portion 38. A second plate 42 is mounted within the second tubular portion 38, and together with coupling plate 40 define a region 34. The region 34 is provided in the support arm 16 to maintain a radiation seal in the hole 18. The region 34 is filled with a suitable material such as steel shot 44 to provide a radiation barrier. Helical conduits 46A and 46B are joined to the coupling plate 40 and the plate 42. The conduits 46A and 46B are aligned with apertures 47 (FIG. 5) of the coupling plate 42 to provide pathways for the electrical lines 31 and the pneumatic lines 33 extending between the ends 30A and 30B. Of course, suitable apertures, not shown, are also provided in the plate 42. The conduits 46A and 46B are bent or curved in the region 34 in order to prevent a straight line path for radiation.

Referring to FIGS. 4 and 6, an end plate 50 is secured to an end 38A of the second tubular portion 38 remote from the coupling plate 40. A mounting flange 52 is secured to the end plate 50, for example, with a plurality of bolts, not shown. The mounting flange 52 retains the support arm 16 within the hole 18. As is conventionally known, a mounting ring 54 is commonly embedded in the wall 10A about an end of the hole 18 facing the region 22. The mounting flange 52 contacts the mounting ring 54 when the support arm 16 has been inserted within the hole 18. A plurality of bolts 56 extend through apertures 58 in the mounting flange 52 and threadably engage apertures 60 in the mounting ring 54 to secure the support arm 16 in place.

Figure 7:
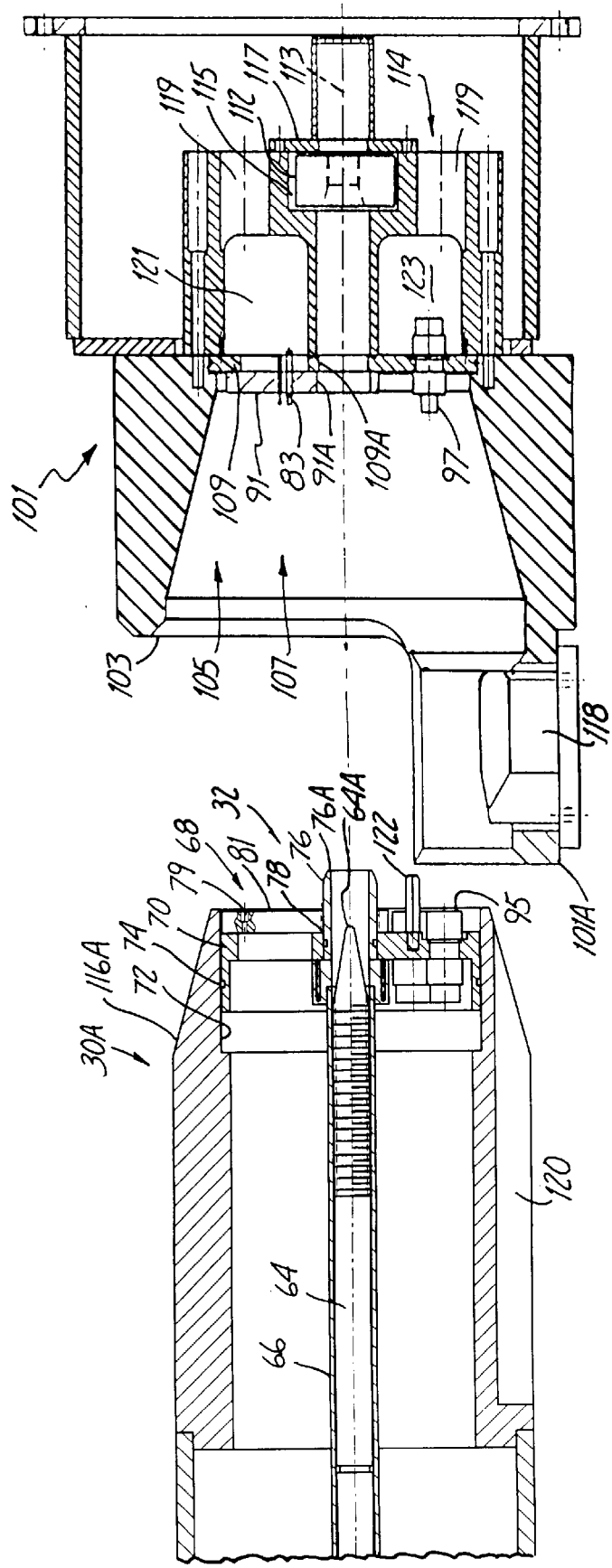
FIG. 7 is a sectional view of a coupling portion of the support arm and a coupling portion of the movable arm.

In the embodiment illustrated, a drawbar assembly 62, shown generally in FIG. 4 and in detail in FIGS. 6 and 7, provides a device for pulling and guiding the end of the movable arm 14 toward the support arm 16 to form the coupling 20. The drawbar assembly 62 includes a rod 64 extending from the end 30B through the outer housing 30 to the end 30A. The rod 64 is rotatable and slidable in a sleeve 66 that also extends from the end 30B to the end 30A wherein suitable apertures are provided in the coupling plate 40, the plate 42, the end plate 50 and the mounting flange 52. Referring to FIG. 7, the sleeve 66 is coupled to and moves with an end plate assembly 68. In the embodiment illustrated, the end plate assembly 68 includes a cylindrical support member 70 slidable in a recess 72 provided on the end 30A. An o-ring 74 is provided in an annular groove of the support member 70 to form a seal between the support member 70 and an inner surface of the recess 72. A guide tube 76 is secured to the support member 70 and extends through an aperture 78. The guide tube 76 receives an end of the sleeve 66 and couples the sleeve 66 to the support member 70.

Referring back to FIG. 6, an end of the rod 64 remote from the end 30A is secured to a handle 80. The rod 64 extends through apertures 82 and 84 formed in plates 86 and 88 of a support structure 90. The support structure 90 is secured to the mounting flange 52 and includes a column 92 supporting the plate 86 from the mounting flange 52. A second column 94 is secured to the plate 86 and supports the plate 88 away from the plate 86.

An arm 96 is secured to the sleeve 66 on an end remote from the end plate assembly 68. The arm 96 is secured to a rod 98 that extends through apertures 100 and 102 provided in the plates 86 and 88, respectively. Nuts 104, 106, 108 and 110 on the rods 64 and 98 are used to linearly displace the rod 64 and the sleeve 66 as well as secure the rod 64 and the sleeve 66 in position. Flanged thrust bearings 82A, 84A, 100A and 102A are located in each of the apertures 82, 84, 100 and 102 to provide bearing surfaces on the plates 86 and 88.

The end 30A of the support arm 16 mates with a housing 101 illustrated in FIGS. 7–10 to form the coupling 20. The housing 101 includes an opening 103 and a recess 105 extending from the opening 103 to electrical and pneumatic coupling devices 107 that individually mate with each corresponding coupling device of the plurality of coupling devices 32 on the end 30A. In the embodiment illustrated, the coupling devices 32 and 107 comprise electrical and pneumatic connectors. Referring first to the electrical connectors of the coupling devices 32, female devices, one of which is illustrated at 79, are mounted to a support board 81 that in turn is secured to the support member 70. The female devices 79 individually mate with male devices 83 (FIGS. 7 and 8) in the housing 101. The male devices 83 are mounted to a board 91 that, in turn, is secured to a support plate 109. Similarly, pneumatic connections are made with female connectors 95 on the end 30A and corresponding male connectors 97 in the housing 101.

The support board 81 and the support plate 109 include apertures 91A and 109A, respectively, that receive an end 76A of the guide tube 76. A nut 112 is aligned with the aperture 111 and disposed in the housing 101 so as to "float" in a plane perpendicular to an axis 113 of the aperture 111. In the embodiment illustrated, the nut 112 is supported in a recess 115 of a holder 114. Inner surfaces of the recess 115 are adapted to correspond with outer surfaces of the nut 112 so as to hold the nut 112 when the rod 64 threadably engages the nut 112. An end cap 117 is joined to the holder 114 to retain the nut 112 in the recess 115. Pathways 119 extend within the holder 114 to inner cavities 121 and 123 for electrical and pneumatic lines, not shown.

The drawbar assembly 62 operates as follows to form the coupling 20 between the movable arm 14 and the support arm 16. With the housing 101 proximate the end 30A, and with the end support member 70 retracted into the recess 72 to protect the coupling devices 32, The handle 80 is pushed from its position in dashed lines and the rod 64 is displaced linearly within the sleeve 66 so that a rod end 64A extends beyond the end 76A of the guide tube 76 and engages the nut 112. In the embodiment illustrated, the rod end 64A is conically shaped in order to easily align with the nut 112. Rotation of the handle 80 rotates the rod 64 in the sleeve 66 to threadably engage the rod 64 with the nut 112. The nut 104 is then positioned against the flanged thrust bearing 82A. Continued rotation of the handle 80 with the nut 104 contacting the flanged thrust bearing 82A linearly advances the nut 112 on the rod 64 to pull the housing 101 and the movable arm 14 toward the end 30A. In the embodiment illustrated, the recess 105 is conical so as to correspond with a conical end 116A of the end 30A in order to further align the coupling devices 32 with the coupling devices 107.

The angle of taper for the mating surfaces of end 116A and the housing 101 can be varied to provide a self-locking or self-releasing feature as required. In the embodiment illustrated, the angle of taper between the mating surfaces provides a self-releasing coupling.

The housing 101 preferably includes an extending U-shaped portion 101A having a key 118 extending upwardly. As the housing 101 couples with the end 30A, the key 118 is guided in a channel 120 formed in the end 30A. Use of the key 118 and the channel 120 prevents rotation of the housing 101 on the end 30A. At this time, the moveable arm 14 is rigidly joined to the support arm 16, but the coupling devices 32 and the coupling devices 107 are spaced-apart from each other.

To ensure alignment of the coupling devices 32 with the coupling devices 107, the end 76A of the guide tube 76 is received by the apertures 91A and 109A, while a guide pin 122 is received by a corresponding aperture 124 in the support plate 109 (FIG. 8). To engage the coupling devices 32 with the coupling devices 107, the nut 108 is turned against the flanged thrust bearing 102A so as to push the arm 96 and the sleeve 66 in the direction indicated by arrow 99. Of course, nuts 106 and 110 have been previously rotated away from plates 88 and 86, respectively so as to allow movement of the rod 98 in the direction indicated by arrow 99. Referring to FIG. 7, displacement of the rod 66 causes the support member 70 to advance toward the support member 109 thereby coupling the devices 32 with the devices 107.

To decouple the electrical and pneumatic connections, the nut 108 is backed away from the plate 88 and the nut 110 is rotated to pull the sleeve 66 and to pull the end plate assembly 68 into the recess 72. To mechanically decouple the housing 101 from the end 30A, proper rotation of the handle 80 rotates the rod 64 to disengage the rod 64 from the nut 112. To provide a positive means of separating the housing 101 from the end 30A under accident or self-locking conditions, the nut 104 can be turned against the flanged thrust bearing 84A of plate 88 (illustrated in dashed lines) forcibly separating the tapered surfaces by pushing the nut 112 against the end cap 117. Of course, prior to decoupling of the movable arm 14 from the support arm 16, the crane 24 (FIG. 1) is positioned so as to engage a lifting bail 125 of the movable arm 14. After decoupling, the crane 24 can return the movable arm 14 to the storage rack 26. Removal of the bolts 56 (FIG. 6) allows the support arm 16 to be withdrawn from the hole 18. Replaceable slide rails 131 (FIG. 5) secured to the outer housing 30 along the length of support arm 16 insertable in the hole 18 reduce wear on the outer housing 30.

Figure 11:
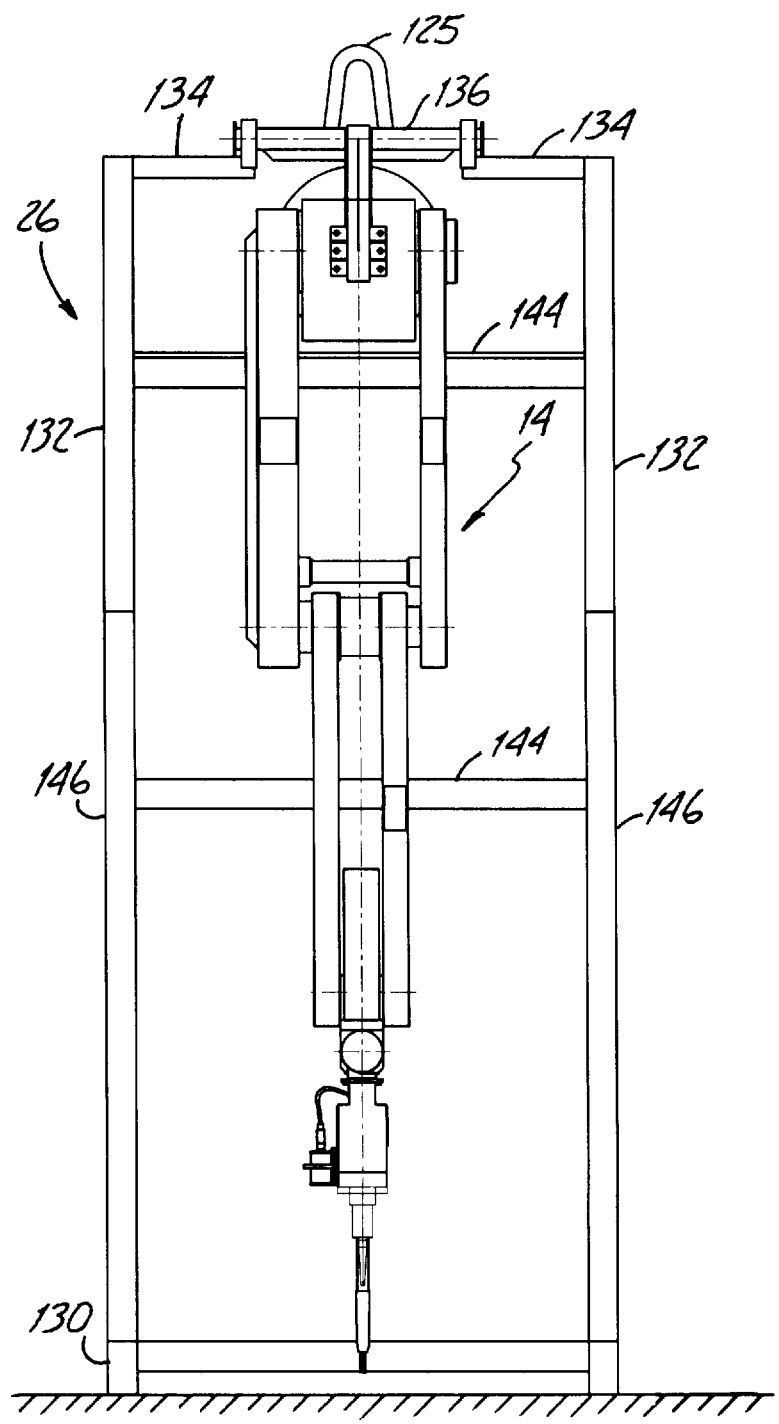
FIG. 11 is a front elevational view of a storage rack and the movable arm.
Figure 12:
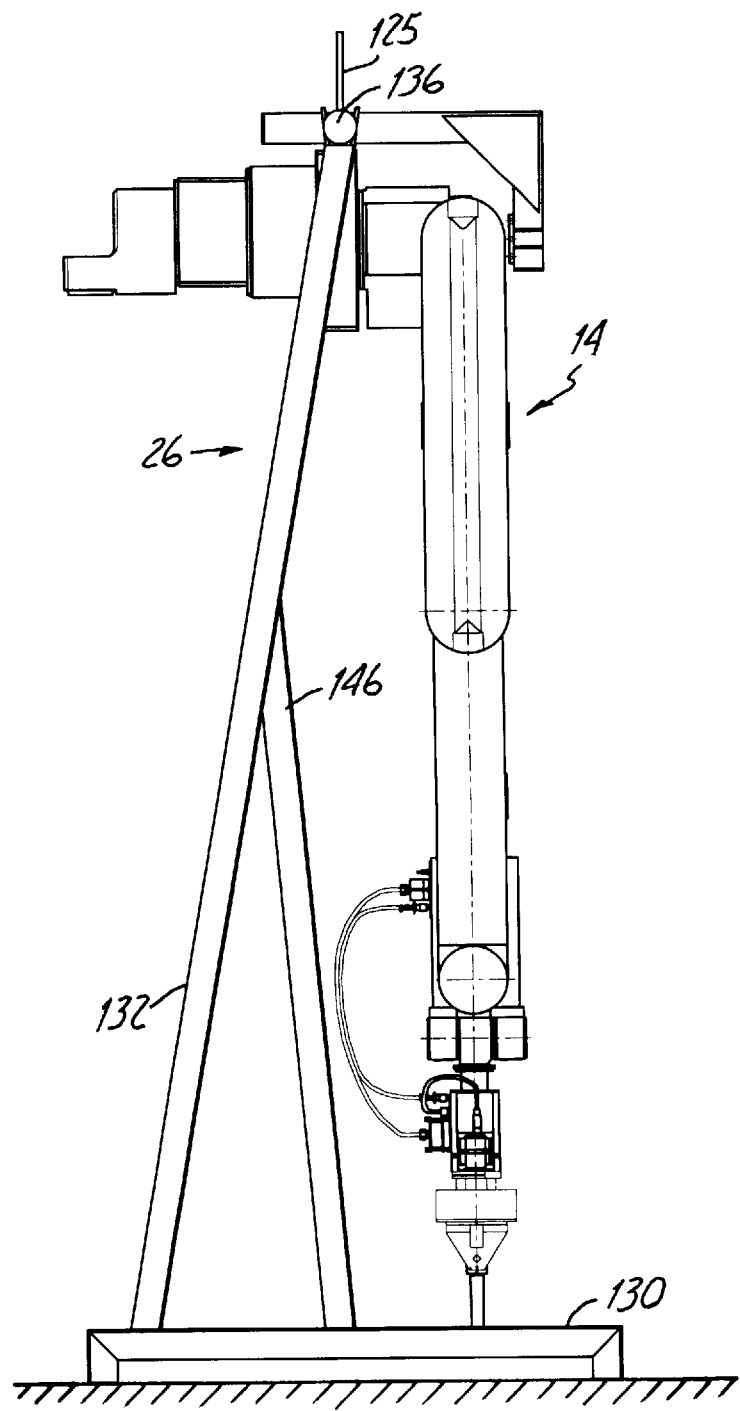
FIG. 12 is a side elevational view of the storage rack and the movable arm.
Figure 13:
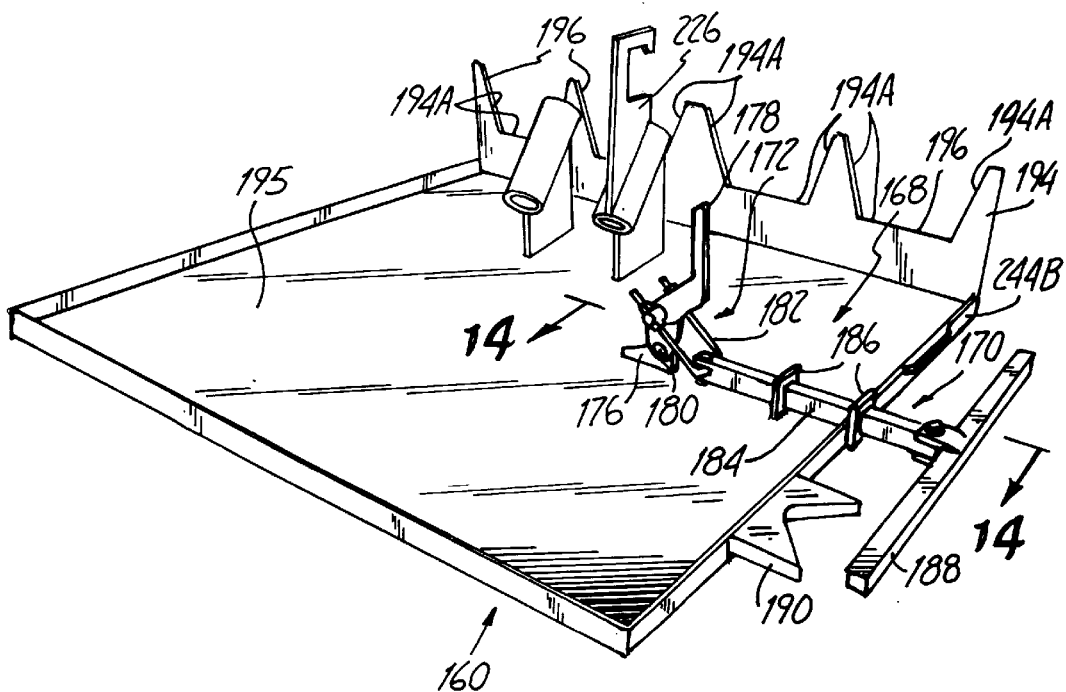
FIG. 13 is a perspective view of a tool table.
Figure 14:
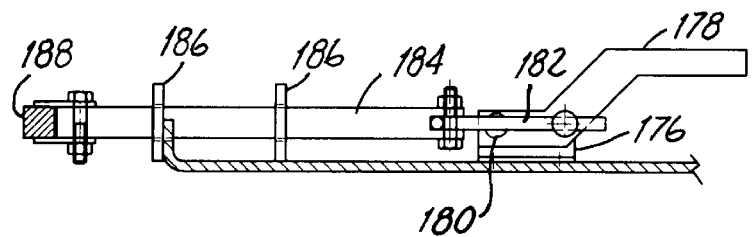
FIG. 14 is a sectional view of the tool table taken along lines 14—14 of FIG. 13.

The storage rack 26 is illustrated in FIGS. 1, 11 and 12. The storage rack 26 includes a base 130. Support columns 132 extend upwardly from the base 130. Each support column 132 includes arms 134 to receive a support shaft 136 of the movable arm 14. Preferably, the support shaft 136 is disposed on the movable arm 14 proximate the center of gravity of the movable arm 14 when the movable arm 14 extends downwardly such as illustrated in FIGS. 11 and 12. Horizontal supports 144 and vertical extensions 146 provide strength for the storage rack 26. Although illustrated in FIG. 1 wherein the storage rack 26 is disposed in the same portion of the hot cell 10 where work is to be performed, it should be understood that the storage rack 26 can be located in a portion (for example, a decontamination room) of the hot cell 10 adjacent the portion where work is performed. In the latter environment, the crane 24 transports the movable arm 14 between the storage rack 26 and the portion of the hot cell 10 where work is performed, lifting and lowering the movable arm 14 through axis panels, not shown, provided in the roof of the hot cell 10.

Referring to FIGS. 1, 2, 3 and 16, the system 12 preferably includes a tool table 160 supporting a plurality of tools 162 that are selectively coupled to a remote end 14A of the movable arm 14. The tools 162 are used in the hot cell 10 for operation and maintenance of equipment located therein. The tool table 160 locates each of the tools 162 in a predetermined position so that the movable arm 14 can quickly interchange the tools on the remote end 14A.

In the embodiment illustrated, the tool table 160 is removably located on a stand 164. The stand 164 is located in the hot cell 10, and in the embodiment illustrated, mounted to the wall 10A of the hot cell 10. The stand 164 includes a support plate 166 upon which the tool table 160 is placed. An aligning mechanism 168 aligns the tool table 160 upon the stand 164 and secures the tool table 160 in position.

Referring to FIGS. 13–16, the aligning mechanism 168 includes a clamp 170 and a pivotable arm 172 to actuate the clamp 170. The aligning mechanism 168 engages posts 174A and 174B that are secured to the stand 164. In particular, the aligning mechanism 168 clamps the aligning posts 174A and 174B between the clamp 170 and the tool table 160.

In the embodiment illustrated, the pivotable arm 172 includes a support flange 176 secured to the tool table 160. A lever 178 is pivotally joined to the support flange 176 to pivot about a pin 180. A connector 182 joins the lever 178 to a rod 184 of the clamp 170. The rod 184 extends through brackets 186 attached to the tool table 160. A crossbar 188 is joined to an end of the rod 184 remote from the connector 182. The posts 174A and 174B are positioned between opposed surfaces of the crossbar 188 and the tool table 160. Preferably, the tool table 160 includes a V-shaped block 190 that engages the post 174B to align the tool table 160 on the stand 164.

The tool table 160 includes a plate 194 having a plurality of recesses 196 for supporting tools of the plurality of tools 162. Each of the tools 162 supported in the recesses 196 includes suitable slots that receive edge portions 194A of the plate 194. An upper surface 195 of the tool table 160 forms a tray for additional tools. Suitable coupling devices are provided on each of the tools 162 and the remote end 14A to supply power and control signals to the individual tool 162 when coupled to the movable arm 14.

Figure 17:
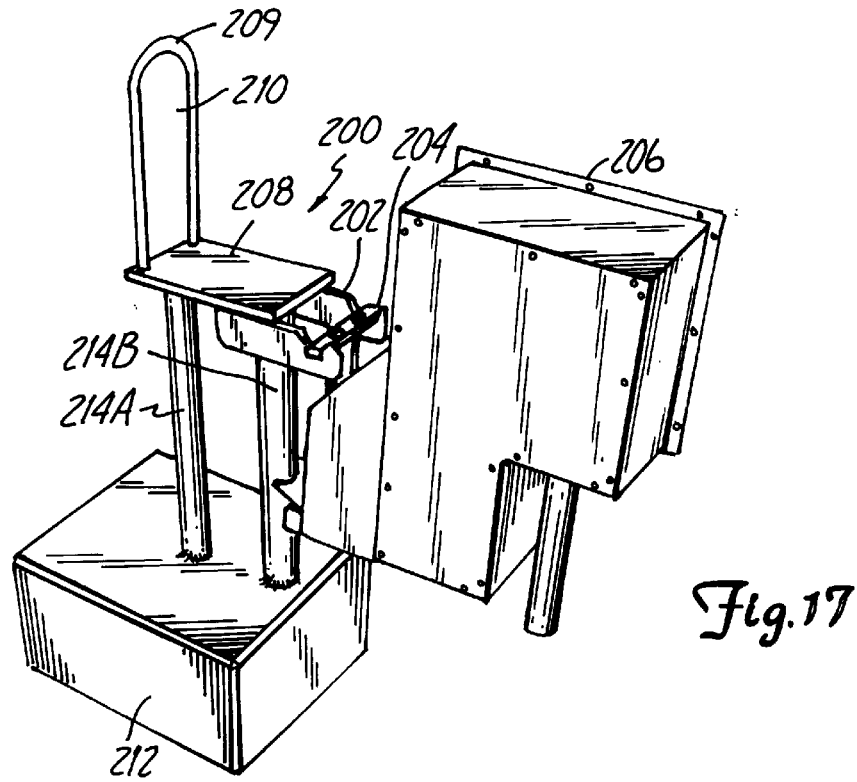
FIG. 17 is a perspective view of a lifting device for a tool.

Location of the tools 162 in the recesses 196 of the plate 194 allows the tools 162 to be separately removed from the hot cell 10. Referring to FIG. 17, a tool lifting device 200 carried by the crane 24 can lift one of the plurality of tools 162 when removal is desired. The tool lifting device 200 includes a suitable hooking element 202 for engaging and lifting a lift bar 204 provided on each of the tools of the plurality of tools 162, one of which is illustrated in FIG. 17 at 206. The hooking element 202 is rigidly attached to a lift assembly 208 having a bail 209 with an aperture 210 to receive a hook 24A from the crane 24. Preferably, the tool lifting device 200 includes a counterweight 212 in sufficient mass to balance the tool lifting device 200 when supported by the crane 24 to keep the tool 206 in an upright position. The counterweight 212 forms a base and is joined to the lift assembly 208 with a support structure herein depicted as columns 214A and 214B.

Figure 18:
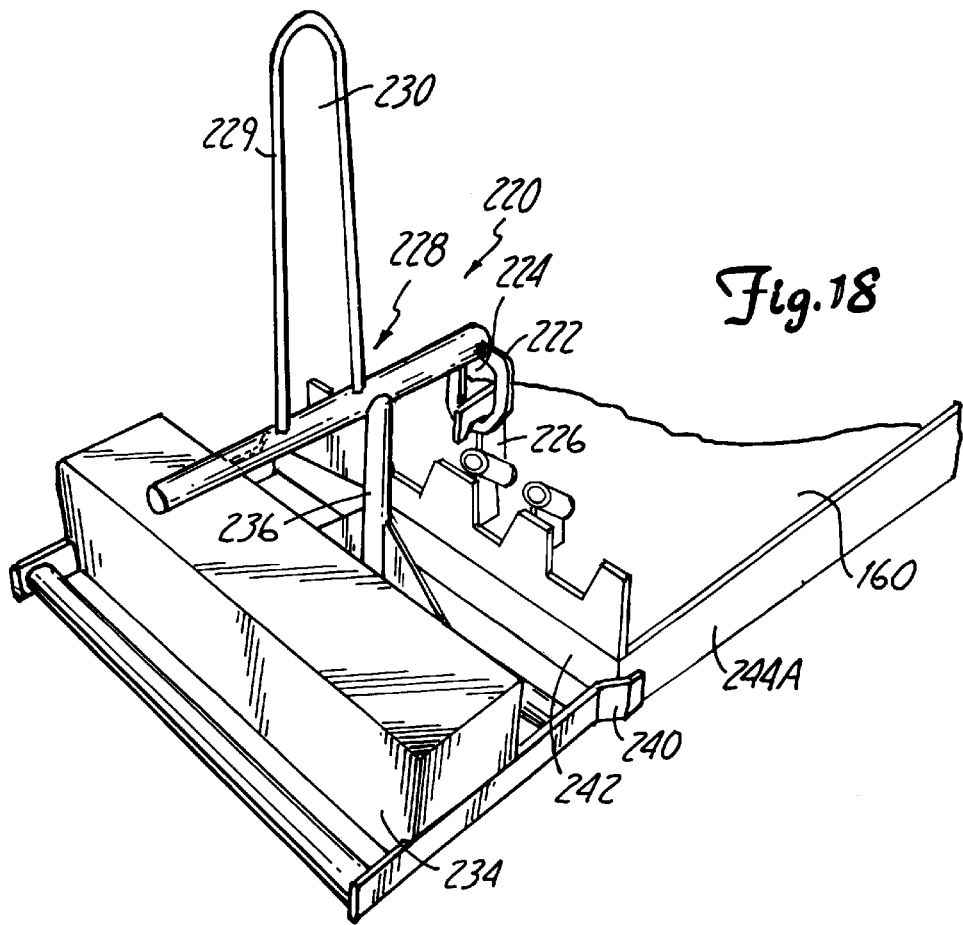
FIG. 18 is a perspective view of a lifting device for the tool table.

As discussed above, the tool table 160 is removably supported on the stand 164. FIG. 18 illustrates a table lifting device 220 suitable for carrying and removing the tool table 160. The table lifting device 220 includes a hooking element 222 having an aperture 224 for receiving a lifting hook 226 provided on the tool table 160. The hooking element 222 is attached to a lift assembly 228 having a bail 229 with an aperture 230 for receiving the hook 24A from the crane 24. A counterweight 234 is provided to maintain the tool table 160 substantially horizontal and parallel to the support plate 166 of the stand 164. A column 236 joins the counterweight 234 to the lift assembly 228. Ears, one of which is illustrated at 240, are provided in each side of the counterweight 234. The ears 240 provide additional support by contacting the tool table 160 on a front surface 242 and side surfaces 244A and 244B.

Although the present invention has been described with reference to preferred embodiments, workers skilled in the art will recognize that changes may be made in form and detail without departing from the spirit and scope of the invention.

What is claimed is:

1. A system for performing work in a hot cell, the hot cell having an access hole, the system comprising:
   a support arm having a first end insertable through the access hole into the hot cell and a second end;
   a movable arm having an end larger than the access hole selectively engageable with the first end to form a rigid connection; and
   complementary coupling devices, disposed on the first end of the support arm and the end of the movable arm, that mate together when the movable arm is joined to the support arm.

2. The system of claim 1 and further comprising a storage rack for supporting the movable arm when the movable arm is not joined to the support arm.

3. The system of claim 2 and further comprising a crane for transporting the movable arm to and from the storage rack.

4. The system of claim 1 wherein the complementary coupling devices comprise electrical coupling elements.

5. The system of claim 4 and further comprising a controller, and signal lines connected to the electrical coupling elements disposed on the support arm and the controller, the signal lines extending through the support arm.

6. The system of claim 5 wherein the complementary coupling devices comprise pneumatic coupling elements.

7. The system of claim 6 and further comprising a source of air, and pneumatic lines connected to the pneumatic coupling elements disposed on the support arm and the controller, the pneumatic lines extending through the support arm.

8. The system of claim 1 and means for pulling the end of the movable arm into engagement with the support arm.

9. The system of claim 8 wherein the means for pulling comprises a drawbar.

10. The system of claim 9 wherein the drawbar extends from the first end to the second end of the support arm.

11. The system of claim 10 and further comprising a sleeve extending from the first end to the second end of the support arm, the drawbar disposed in and slidable within the sleeve.

12. The system of claim 11 and further comprising an end plate slidable in a recess on the first end of the support arm, the end plate coupled to the sleeve.

13. The system of claim 12 wherein the coupling devices disposed on the support arm are mounted to the end plate.

14. The system of claim 1 and further comprising a tool table for supporting a plurality of tools selectively connectable to a second end of the movable arm.

15. The system of claim 14 and further comprising a tool lifting assembly for lifting a tool of the plurality of tools, the tool lifting assembly including a bail; and a crane engageable with the bail to lift the tool lifting assembly.

16. A system for performing work in a hot cell, the system comprising:
   a support arm having a first end and a second end;
   a movable arm having an end selectively engageable with the first end to form a rigid connection;
   complementary coupling devices, disposed on the first end of the support arm and the end of the movable arm, that mate together when the movable arm is joined to the support arm;
   a plurality of tools selectively connectable to a second end of the movable arm;
   a tool table for supporting the plurality of tools;
   a tool lifting assembly for lifting a tool of the plurality of tools, the tool lifting assembly including a bail; and
   a crane engageable with the bail to lift the tool lifting assembly.

17. The system of claim 16 and aligning means for aligning the tool table in a selected position in the hot cell.

18. The system of claim 17 wherein the aligning means comprises a clamp.

19. The system of claim 1 wherein the end of the movable arm includes a housing having an opening for receiving the first end of the support arm therein, the housing being larger than the access hole.

20. The system of claim 1 wherein the first end includes a movable plate, and wherein the complementary coupling devices on the first end are secured to the moveable plate, and wherein the moveable plate is moved to mate the complementary coupling devices together after the end of the moveable arm has been at least partially joined to the first end.

21. A system for performing work in a hot cell, the system comprising:
   a support arm having a first end and a second end;
   a movable arm having an end selectively engageable with the first end to form a rigid connection;
   complementary coupling devices, disposed on the first end of the support arm and the end of the movable arm, that mate together when the movable arm is joined to the support arm; and
   means for pulling the end of the movable arm into engagement with the support arm, said means being extendable out from the first end of the support arm.

22. A system for performing work in a hot cell, the system comprising:
   a support arm having a first end and a second end;
   a movable arm having an end selectively engageable with the first end to form a rigid connection;
   complementary coupling devices, disposed on the first end of the support arm and the end of the movable arm, that mate together when the movable arm is joined to the support arm; and
   a drawbar extendable from the first end to engage the end of the movable arm.

23. The system of claim 22 wherein the drawbar extends from the first end to the second end of the support arm.

24. The system of claim 23 and further comprising an end plate slidable in a recess on the first end of the support arm, wherein the coupling devices of the support arm are disposed on the end plate.

25. The system of claim 24 wherein the drawbar extends through the end plate.

26. The system of claim 22 wherein the end of the moveable arm includes a floating nut for receiving the drawbar.

27. A system for performing work in a hot cell, the system comprising:

a support arm having a first end having a recess and a second end;

an end plate selectively slidable in the recess between a first position and a second position;

a movable arm having an end selectively engageable with the first end to form a rigid connection; and complementary coupling devices, disposed on the end plate and the end of the movable arm, coupleable after forming the rigid connection, wherein the complementary coupling devices are coupled together when the end plate is in the first position and are uncoupled when the end plate is in the second position.

28. The system of claim 27 an actuator for moving the end plate between the first position to the second position.

29. The system of claim 16 and further comprising a table lifting assembly for lifting the tool table, the table lifting assembly including a bail, wherein the crane is engageable with the bail of the table lifting assembly to lift the table lifting assembly.

* * * * *